US009348553B2

(12) United States Patent
Curtis et al.

(10) Patent No.: US 9,348,553 B2
(45) Date of Patent: *May 24, 2016

(54) ELECTRONIC DISPLAY TILING APPARATUS AND METHOD THEREOF

(71) Applicant: RealD Inc., Beverly Hills, CA (US)

(72) Inventors: Kevin Curtis, Boulder, CO (US); Wilhelm Taylor, Longmont, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/615,313

(22) Filed: Feb. 5, 2015

(65) Prior Publication Data

US 2015/0153995 A1 Jun. 4, 2015

Related U.S. Application Data

(63) Continuation of application No. 13/655,277, filed on Oct. 18, 2012, now Pat. No. 9,030,375.

(60) Provisional application No. 61/548,717, filed on Oct. 18, 2011, provisional application No. 61/559,720, filed on Nov. 14, 2011.

(51) Int. Cl.
*G09G 5/00* (2006.01)
*G06F 3/14* (2006.01)
*G09G 5/10* (2006.01)

(52) U.S. Cl.
CPC ............... *G06F 3/1446* (2013.01); *G09G 5/10* (2013.01); *G09G 2320/0233* (2013.01); *G09G 2354/00* (2013.01); *G09G 2380/00* (2013.01)

(58) Field of Classification Search
CPC ............... G09G 2320/0233; G09G 2354/00; G09G 2380/00; G09G 5/10; G09G 2300/026; G09G 2310/0232; G09G 2340/0471; G09G 2360/122; G09G 3/36; G09G 3/3666; G09G 5/14; G09G 2300/023; G09G 2320/0238; G09G 3/3406; G09G 3/3648; G09G 2320/0646; G09G 3/002; G09G 3/20; G02F 1/133615; G02F 2001/133342; G02F 1/13336; G02F 1/133524; G02F 1/133603; G02F 1/13471; G02F 1/133555; G02F 1/133526; G02F 1/1323; G02F 1/33504; G02F 1/133536; G02F 1/13362; G02F 1/1333; G06F 3/1446; G06F 3/1423; G06F 1/1641; G06F 3/1438; G06F 1/1616; G06F 1/1647; G06F 1/1652; G06F 3/041; G06F 1/1637; G06F 1/1654; G06F 1/1677; G06F 1/1618; G06F 1/1632

USPC ..................................... 345/1.1–1.3, 2.1–2.3
IPC ...... H04N 13/0422,13/0454, 13/0411, 13/0415, H04N 13/0495, 9/12, 9/3126, 9/3147, 13/0239, H04N 13/0285, 13/0409, 13/0413, 13/0425, H04N 13/0434, 5/44591, 5/74, 5/7441, 9/3102, H04N 9/3105, 9/3129, 9/3155, 9/3194, 9/3197

See application file for complete search history.

(56) References Cited

U.S. PATENT DOCUMENTS 5,903,328 A * 5/1999 Greene et al. ................... 349/73
6,611,241 B1 8/2003 Firester et al.

(Continued)

FOREIGN PATENT DOCUMENTS

KR 10-2002-0068284 A 8/2002
KR 10-2005-0086891 A 8/2005

OTHER PUBLICATIONS

International search report and written opinion of PCT/US12/90873 dated Jan. 1, 2011.

(Continued)

*Primary Examiner* — Duc Dinh
(74) *Attorney, Agent, or Firm* — Neil G. Mothew; Penny L. Lowry

(57) ABSTRACT

Disclosed is a method and apparatus for substantially eliminating the appearance of seams between tiled panels of a display. Non-imaging magnification may be used to substantially eliminate the appearance of seams. Additionally, the appearance of seams between the tiled panels of a display may be substantially eliminated by employing propagation based elimination. The methods disclosed can be used to generate substantially seamless 2D and 3D displays. Additionally, a method and apparatus for achieving substantially uniform panel brightness and color correction may be addressed. The substantially seamless tiled displays may employ specific data formats for use in displaying images on the individual displays which may be tiled together to form a larger, substantially seamless tiled display and may employ other techniques not utilized in known video wall applications. These functions may include an intensity envelope in addition to substantially complying with the Digital Cinema Initiative ("DCI") security concerns.

13 Claims, 7 Drawing Sheets

(56) References Cited

U.S. PATENT DOCUMENTS

| | | |
|---|---|---|
| 6,680,761 B1 | 1/2004 | Greene et al. |
| 7,239,367 B2 * | 7/2007 | Jin et al. .......................... 349/159 |
| 7,489,286 B2 * | 2/2009 | Kawase et al. ................. 345/1.1 |
| 8,194,119 B2 * | 6/2012 | Ramstad .......................... 348/51 |
| 2002/0080302 A1 | 6/2002 | Dubin |
| 2004/0017687 A1 | 1/2004 | Misaras |
| 2006/0082702 A1 * | 4/2006 | Jacobs et al. .................... 349/96 |
| 2008/0226846 A1 | 9/2008 | Hill et al. |
| 2010/0011641 A1 | 1/2010 | Hill et al. |

OTHER PUBLICATIONS

International search report and written opinion of PCT/US12/60867 dated Mar. 29, 2013.

* cited by examiner

ELECTRONIC DISPLAY TILING APPARATUS AND METHOD THEREOF

CROSS-REFERENCE TO RELATED APPLICATIONS

This application is a continuation application and claims priority to U.S. patent application Ser. No. 13/655,277, filed Oct. 18, 2012, entitled "Electronic display tiling apparatus and method thereof" which claims priority to U.S. Provisional Patent Application Ser. No. 61/548,717, filed Oct. 18, 2011, entitled "Seamless electronic display tiling," and U.S. Provisional Patent Application Ser. No. 61/559,720, filed Nov. 14, 2011, entitled "Electronic display apparatus and method thereof", all of which are commonly-assigned and all of which are incorporated herein by reference for all purposes.

TECHNICAL FIELD

The present disclosure generally relates to displays, and more specifically, to two dimensional and three dimensional display technologies.

BACKGROUND

Generally, current projection and display technologies may include functionality to deploy, view and/or display three dimensional ("3D") content. Recently, the increased demand for such functionality has driven the need for enhanced performance of projection and/or display technology, including increasing the brightness of the display. For example, larger displays may include multiple smaller displays tiled together. Such a configuration may be known as a video wall. A video wall may include multiple displays, monitors, projector based displays, televisions, liquid crystal displays, light emitting diode displays, organic light emitting diode displays and so forth, tiled together and adjacent to one another or overlapped to form a larger display.

BRIEF SUMMARY

According to the present disclosure, a method for reducing the appearance of seams in a video wall may include locating a first panel which may include at least a first macro pixel proximate to a second panel, wherein the second may include at least a second macro pixel. The appearance of a seam may be formed by the first panel and the second panel. The method may also include locating a first waveguide so that light from the first macro pixel may be substantially coupled into the first waveguide and locating a second waveguide so that light from the second macro pixel may be substantially coupled into the second waveguide. The first waveguide and the second waveguide may be operable to alter the light such that the appearance of the seam may be in the approximate range of a just noticeable difference. Additionally, a first perimeter of the first panel may substantially overlap with a second perimeter of the second panel. A new image plane may be created by the light emitting from at least the first waveguide and the second waveguide and a substrate may be located at the new image plane. In one example, the substrate may be a diffuser.

Continuing the discussion of the method for reducing the appearance of seams in a video wall, the first waveguide may be off axis relative to the plane of the first panel. In another example, the first waveguide may have a first section and a second section, and the first section may be operable to receive light from the first macro pixel and may be angled off axis relative to the plane of the first panel, and the second section of the first waveguide may have a substantially straight section from which the light may exit. The length of the second section of the first waveguide may be primarily determined by accounting for at least the x and y base dimensions of the first section of the first waveguide. Additionally, the off axis angle of the first waveguide and the off axis angle of the second waveguide may be different.

Still continuing the discussion of the method for reducing the appearance of seams in a video wall, the method may include locating a fixed pattern retarder proximate to the substrate at the new image plane and allowing the first macro pixel and the second macro pixel to employ six colors to create stereoscopic images. Further, the first macro pixels and the second macro pixels may display corresponding stereo pairs at substantially the same time with a first set of colors corresponding to the first macro pixel and a second set of colors corresponding to the second macro pixel. However, stereoscopic images may also be produced by displaying time sequential images.

According to another embodiment of the present disclosure, a display system may include a video wall. The video wall may include a first panel with at least a first macro pixel, a second panel with at least a second macro pixel, and the second panel may be proximate to the first panel such that the appearance of a seam is created. The video wall may also include a first waveguide proximate to the first panel so that light from the first macro pixel may be substantially coupled into the first waveguide, a second waveguide proximate to the second panel so that light from the second macro pixel may be substantially coupled into the second waveguide, and a substrate located at approximately where the light from the first macro pixel and the second macro pixel expand so that the seam may be substantially imperceptible.

The display system may also include a first controller operable to communicate with at least a media server and the video wall, and the second server may be operable to communicate with at least an automation system and may be further operable to store at least video content. The first panel and the second panel may be operable to receive sub-pictures for displaying, wherein the sub-picture information may be primarily determined at least by the spatial location in an overall image display. In one example, the controller may include an internal media block and may be operable to receive encrypted media files. The internal media block may be operable to decrypt encrypted media files and the controller may be operable to separate the decrypted media files into sub-picture data. Further, the first panel and the second panel may receive the sub-picture data and format the sub-picture information for display.

Electronic displays that appear as substantially seamless may be employed for general use in at least cinema and exhibition applications including commercial display applications for business, education, and consumer in home displays. The tiled displays that appear as substantially seamless, may employ specific data formats for use in displaying images on individual displays which may be tiled together to form a larger tiled, near seamless display, and may employ other techniques not utilized in known video wall applications. These functions may include an intensity envelope.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
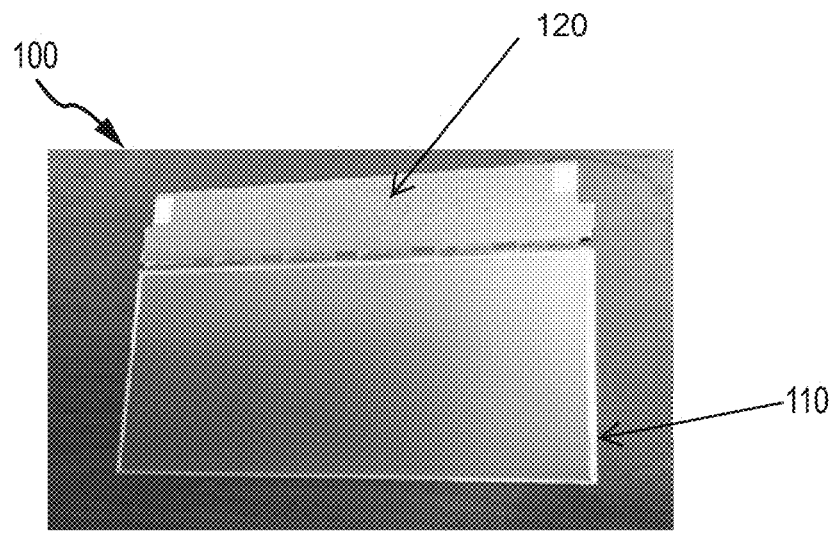
FIG. 1 is a schematic diagram illustrating one embodiment of a liquid crystal display panel.

According to the present disclosure, a method for reducing the appearance of seams in a video wall may include locating a first panel which may include at least a first macro pixel proximate to a second panel, wherein the second may include at least a second macro pixel. The appearance of a seam may be formed by the first panel and the second panel. The method may also include locating a first waveguide so that light from the first macro pixel may be substantially coupled into the first waveguide and locating a second waveguide so that light from the second macro pixel may be substantially coupled into the second waveguide. The first waveguide and the second waveguide may be operable to alter the light such that the appearance of the seam may be in the approximate range of a just noticeable difference. Additionally, a first perimeter of the first panel may substantially overlap with a second perimeter of the second panel. A new image plane may be created by the light emitting from at least the first waveguide and the second waveguide and a substrate may be located at the new image plane. In one example, the substrate may be a diffuser.

Continuing the discussion of the method for reducing the appearance of seams in a video wall, the first waveguide may be off axis relative to the plane of the first panel. In another example, the first waveguide may have a first section and a second section, and the first section may be operable to receive light from the first macro pixel and may be angled off axis relative to the plane of the first panel, and the second section of the first waveguide may have a substantially straight section from which the light may exit. The length of the second section of the first waveguide may be primarily determined by accounting for at least the x and y base dimensions of the first section of the first waveguide. Additionally, the off axis angle of the first waveguide and the off axis angle of the second waveguide may be different.

Still continuing the discussion of the method for reducing the appearance of seams in a video wall, the method may include locating a fixed pattern retarder proximate to the substrate at the new image plane and allowing the first macro pixel and the second macro pixel to employ six colors to create stereoscopic images. Further, the first macro pixels and the second macro pixels may display corresponding stereo pairs at substantially the same time with a first set of colors corresponding to the first macro pixel and a second set of colors corresponding to the second macro pixel. However, stereoscopic images may also be produced by displaying time sequential images.

According to another embodiment of the present disclosure, a display system may include a video wall. The video wall may include a first panel with at least a first macro pixel, a second panel with at least a second macro pixel, and the second panel may be proximate to the first panel such that the appearance of a seam is created. The video wall may also include a first waveguide proximate to the first panel so that light from the first macro pixel may be substantially coupled into the first waveguide, a second waveguide proximate to the second panel so that light from the second macro pixel may be substantially coupled into the second waveguide, and a substrate located at approximately where the light from the first macro pixel and the second macro pixel expand so that the seam may be substantially imperceptible.

The display system may also include a first controller operable to communicate with at least a media server and the video wall, and the second server may be operable to communicate with at least an automation system and may be further operable to store at least video content. The first panel and the second panel may be operable to receive sub-pictures for displaying, wherein the sub-picture information may be primarily determined at least by the spatial location in an overall image display. In one example, the controller may include an internal media block and may be operable to receive encrypted media files. The internal media block may be operable to decrypt encrypted media files and the controller may be operable to separate the decrypted media files into sub-picture data. Further, the first panel and the second panel may receive the sub-picture data and format the sub-picture information for display.

Generally, one embodiment of the present disclosure may take the form of a method for substantially eliminating the appearance of seams between tiled panels of a display. In another embodiment, waveguide non-imaging magnification may be used to optically conceal seams between tiled panels. In yet another embodiment, the appearance of seams between the tiled panels of a display may be substantially eliminated by employing propagation based elimination. Additionally, in another embodiment, substantially uniform panel brightness and color correction may be addressed.

In another embodiment, the present disclosure may take the form of near seamless electronics displays which may allow for general use in at least cinema and exhibition applications as well as in commercial and consumer display applications. The substantially seamless tiled displays may employ specific formats of the data for use in displaying images on the individual displays and may employ other techniques not utilized in known video wall applications. These functions may include an intensity envelope in addition to substantially complying with the Digital Cinema Initiative ("DCI") security requirements.

FIG. 1 is a schematic diagram illustrating one embodiment of a liquid crystal display ("LCD") panel 100. The LCD panel 100 illustrated in FIG. 1 has a border 110 which may be dead space or a gap, and which may be primarily responsible for the visible seams in the larger composite display. In one example, multiple LCD panels may be placed adjacent to one another with the borders located next to each other, or overlapping one another. In this example, due to the overlapping borders, a gap or dead space may be visible between the displays of the LCD panels. As illustrated in FIG. 1, the LCD panel also has a portion 120 which may be flexible and which may include drive and interface electronics. Typical video walls use LCD panels that are enclosed with a structure that includes the power and drive electronics. This typically increases the bezel size and thus the seam size between displays. LCD panels can refer to the basic panel itself or the encased panel with drive and power electronics. Similarly, displays can refer to the basic display or the packaged display with electronics.

Figure 2:
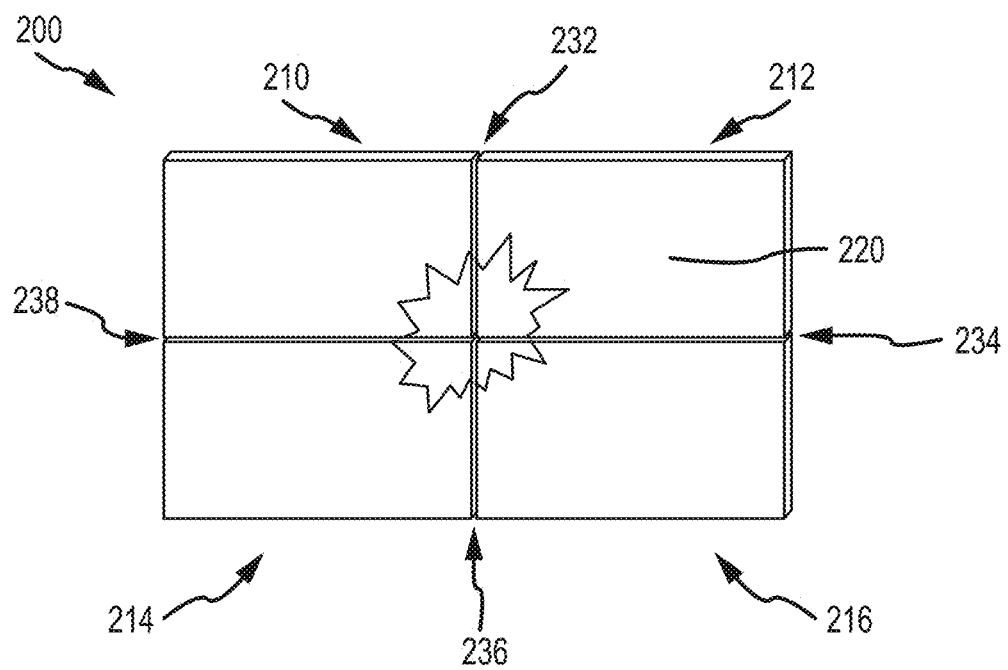
FIG. 2 is a schematic diagram illustrating one embodiment of a video wall.

FIG. 2 is a schematic diagram illustrating one embodiment of a video wall. FIG. 2 illustrates a video wall 200 with four displays 210, 212, 214, 216, assembled to present an image 220 on a much larger composite display. The four displays may produce clearly visible static lines or blank gaps 232, 234, 236, 238, between the individual panels or displays that make up the larger composite display. Although some screens may have narrow bezels for minimizing mullion, the lines or gaps may still be visible. The gaps can be reflective or dark. Most video walls use dark bezels so that the seams may appear dark.

While these tiled displays certainly have a place in the market, the seams (gaps or mullions) make these displays completely unacceptable for viewing high quality video or still images. These gaps or mullions may be unacceptable in locations including, but not limited to, movies theaters and large venue theaters.

This disclosure presents several apparatus and methods of substantially eliminating the appearance of seams between panels or displays and methods to substantially match performance between the tiled panels/displays so that high quality video can be achieved with low cost direct view devices in either 2-dimensional (2D) or 3-dimensional (3D) formats. For discussion purposes only, the terms panels and displays may be used interchangeably herein. Furthermore, panels and displays may be tiled together and referred to herein as a video wall, composite panel, composite display, a composite panel display, any combination thereof and so forth.

By substantially eliminating the appearance of seams in tiled display panels, a higher quality viewing experience can result along with lower associated costs. Rear projection or direct view panels/displays including, but not limited to, LCD panels, LED panels, LED illuminated LCD panels, plasma panels, and OLED panels, or any combination thereof can be assembled to form various size displays.

In one example, an approximately 40 foot cinema screen may include a ten by nine array of 55 inch panels. The individual panels may be in the approximate cost range of $100-$400. Thus, the materials without drive electronics and mechanical support may be approximately $30,000. The tiled panel system may replace a projector that may be approximately $60,000 and a screen that may be in the approximate price range of $10,000-$15,000. Additionally, the projector lamp cost may be eliminated, which may be in the approximate range of $3,000-$9,000 a year.

Continuing the discussion, the aforementioned panels may yield a very high resolution composite display that may typically be approximately equal to or greater than 1920×1080 pixels. Further, the tiled panel system may support 4K or 8K resolution or any resolution which may be at least as good as or better than the best current digital cinema format. Additionally, the tiled panel system may have an ANSI contrast of approximately 1000:1 which is approximately three times better than a projector/screen system. The tiled panel system may also be able to provide at least 14 foot Lamberts (ftL) brightness in both 2D and 3D which may be approximately two to five times brighter than current projectors in 3D mode.

Larger format video walls can be made by tiling smaller panels together to produce larger screens, such as 55 inch or larger displays available in, for example, LCD technology. However, issues with attaining these performance and cost advantages comes may include substantially eliminating the appearance of dark seams or mullion between the panels and achieving substantially uniform brightness and color across the entire video wall.

Substantially Eliminating the Appearance of Seams Between Panels

Figure 3:
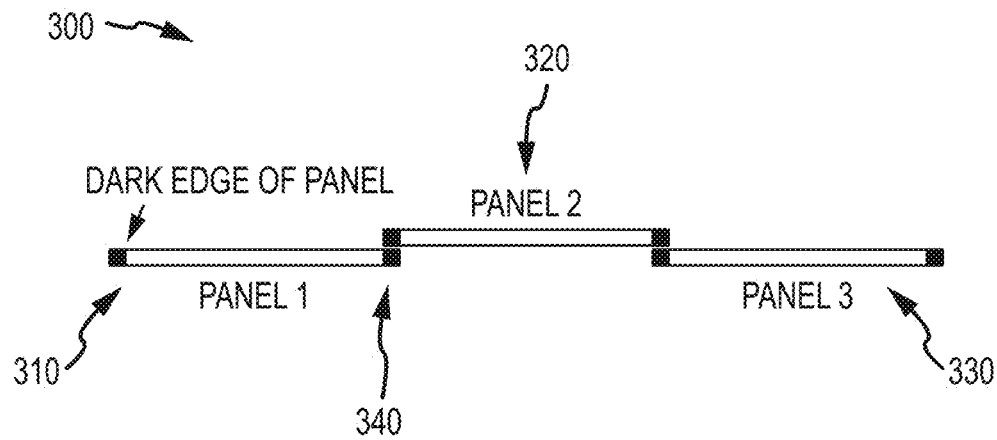
FIG. 3 is a schematic diagram illustrating one configuration of a set of panels, in accordance with the present disclosure.

Typically, the panels may have several millimeters (mm) of space around the panel perimeter or the edges in which the gaskets may be mounted on LCD panels. The space may be attributed to manufacturing specifications as well as the driver electronics on one side of the panel as illustrated in FIG. 1. The gap may be minimized by overlapping the panels in 1D or 2D but that still leaves a sizable gap 340 as illustrated in FIG. 3. FIG. 3 is a schematic diagram illustrating one configuration of a set of panels 300 which includes a first panel 310, a second panel 320, and a third panel 330. As illustrated in FIG. 3, the perimeter or dark edge of the second panel 320 may overlap with the perimeter or dark edge of the first panel 310 and the third panel 330, but the dark edge of the second panel may still be visible. Because the panels may be relatively thin and also due to the relatively poor depth resolution for humans, an offset in the z-direction may be acceptable. Generally, overlapping may make maintenance and repair of individual panels quite difficult and thus is not done commercially.

In one example, a viewer with average eye sight may be approximately 11 feet away from a feature. At this distance the viewer may be able to resolve an approximately one mm square feature. In addition, due to the periodicity of the dark stationary pattern around the multiple panels and motion of the video on the screens, at approximately 11 feet away, the viewer may be able to resolve fixed, regular features even if the features are smaller than one mm in 2D displays. Additionally, it may be possible for a viewer to resolve fixed patterns as small as approximately 40-200 microns in width. Interestingly, 3D displays may better disguise fixed, regular features as some of the content may allow the eye to accommodate off the screen plane. Even so, the panels can be offset so that the gaps may not be substantially continuously vertical or horizontal across the entire display as this may also help disguise the fixed features.

Although these techniques can minimize the appearance of the gap, it may be desirable to substantially reduce or eliminate the size of the gap with respect to the viewer's resolution for a particular application or viewing distance.

Waveguide Non-Imaging Magnification to Cover the Appearance of Seams

In one embodiment, the seams may be substantially hidden by magnifying an image area of each panel such that at the new screen location or image plane, the panel dead area and the space between panels may appear to be joined with a minimal seam at the new image plane. This could be done with imaging optics but the system would be very large and very complex. Instead by employing non-imaging optics, a quasi-magnification may be achieved such that the appearance of the seams between panels may be minimized enough to become virtually imperceptible to the viewer as shown in FIG. 4.

[[Stated differently, the appearance of the seams between panels may be approximately at or below a just noticeable difference. It may be understood that a just noticeable difference for a typical viewer located at an expected viewing distance, may be such that the viewer may not detect artifacts that are not intended to be part of the image. In one example, a viewer in front of a laptop may be located at a first distance from the laptop. The viewer in front of the laptop may not be able to detect an optical artifact such as a dead pixel on the laptop screen as the appearance of the optical artifact may be approximately at or under a just noticeable difference. In another example, a viewer in a movie theater may be located at a second distance from a movie screen. Further, the viewer in the movie theater may not be able to detect seams in the movie screen as the appearance of the seams in the screen may be approximately at or under a just noticeable difference. Although the seams in the movie screen may be larger than the optical artifact on the laptop, the appearance of both may be approximately at or under a just noticeable difference since both may be substantially imperceptible to the respective viewers located at different distances to the laptop and the screen.

Figure 4:
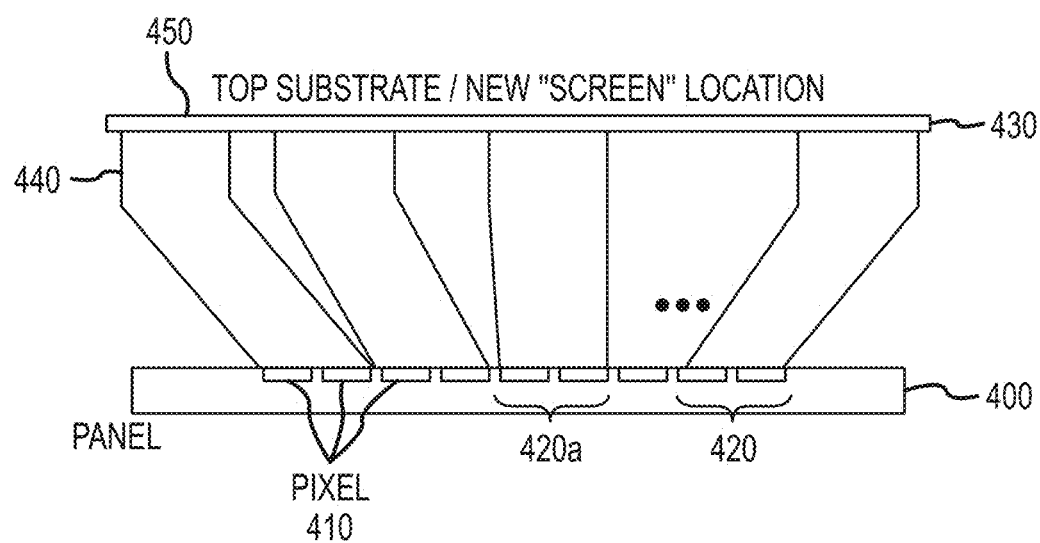
FIG. 4 is a schematic diagram illustrating one embodiment of a panel and non-imaging optics, in accordance with the present disclosure.

FIG. 4 is a schematic diagram illustrating one embodiment of a panel and non-imaging optics. In FIG. 4, the panel 400 may include pixels 410 that emit light which may be modulated in intensity. The light from groups of pixels 420 may then be relayed to a new image plane 430 with magnification using, in this example, waveguides 440. The groups of pixels ("macro pixel") 420 may be arranged in any type of configuration including square configurations such as 2×2, 5×5, and so forth, or rectangular configurations such as 2×4, 3×5, and so forth, may be irregularly shaped with varying numbers of pixels in height and width, may be circular, elliptical, randomly shaped, and so forth. In one example, a macro pixel may be a single pixel. Additionally, the configuration of the macro pixels may be any configuration including irregular, non-periodic configurations. Furthermore, each panel may include one or more macro pixels in which the macro pixels may be similar sizes, similar shapes, various sizes, various shapes, any combination thereof, and so forth.

As shown in FIG. 4, the macro pixels 420 may be adjacent to or proximate to a waveguide 440 that may reflect from the metal surface or due to index of refraction differences (total internal reflection) to relay the light from the macro pixel 420 to the new image plane 430. The waveguides 440 can be hollow and may be filled with air or made of other materials including, but not limited to, glass or plastic. The waveguides 440 can be thin as may be mechanically determined and can be fabricated on the panel or onto another substrate. The top substrate 450 may be approximately located at the new larger image plane 430. The top substrate 450 can be anti-reflection coated and/or hard coated, with SiO2 for example, to prevent scratching or other damage. Although a single top substrate is illustrated in FIG. 4, more than one top substrate may be located at the new image plane and the multiple top substrates may be placed adjacent to one another with a minimal gap in the larger image that may be substantially imperceptible to the viewer. The top substrates may also be tiled or overlapped as discussed above to minimize any dead space between active macro pixels. As illustrated in FIG. 4, the top substrate 450 may be located approximately at the larger new image plane 430. The angle distribution of the light may also be improved by employing a diffuser as the top substrate and/or in addition to the top substrate. Any additional substrate could extend over one, several, or all the panels in the video wall.

As illustrated in FIG. 4, the waveguides 440 may move the center of the macro pixel 420 to the appropriate place for the desired magnification. FIG. 4 illustrates this in one dimension with the light from the center macro pixel 420a relayed substantially straight upwards and may move the light from the macro pixels a progressively increasing offset distance as the location of the macro pixels approaches the edge of the panel 400. The resulting macro pixel size at the new image plane may be determined by the size of the non-imaging waveguide exit pupil. The exit pupil can be the same size as the original macro pixel or slightly larger or smaller. Additionally, the new image plane may be located approximately at or around the plane at which the light from neighboring illuminated macro pixels interacts such that the gaps between the panels is substantially imperceptible or around a just noticeable difference. Further, the light from the neighboring illuminated macro pixels may nearly meet or may actually meet, or there may be gaps between the light from the neighboring illuminated macro pixels to create the new image plane. Although FIG. 4 illustrates the new image plane 430 adjacent to the tops of the waveguides, the new image plane 430 may be located further away from the tops of the waveguides.

Figure 4A:
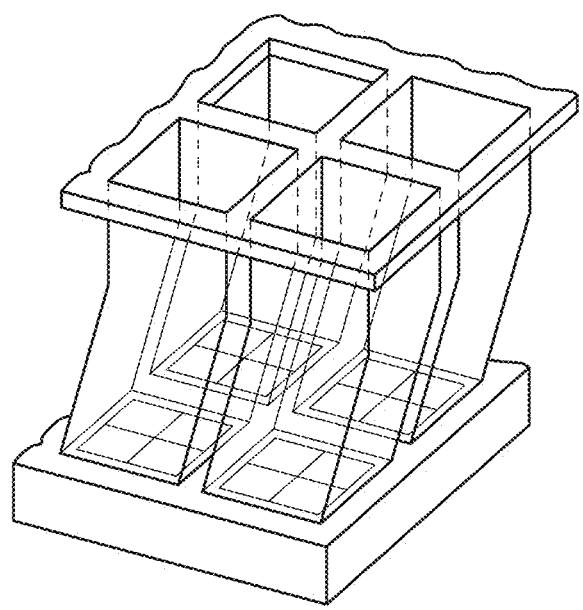
FIG. 4A is a schematic diagram illustrating another embodiment of a panel and non-imaging optics, in accordance with the present disclosure.

Although FIG. 4 illustrates the waveguides in one dimension, the expansion of the image plane may be in two dimensions across the individual panel as illustrated in FIG. 4A. Additionally, the waveguides may be slanted off the horizontal or vertical axis of the panel and may have some angle displacement in both directions. Although FIG. 4A illustrates the macro pixels as an array of 2×2 pixels, a greater number or smaller number of pixels may be used and as discussed herein, the shape of the macro pixels may be non-symmetric, and may be similarly sized to one another or different sizes and shapes.

Grouping pixels together may be desirable for a number of reasons. In one embodiment, it may be appropriate to convert to standard size images and grouping pixels together may be one way to achieve the conversion. For example, a 20×40 foot screen may be approximately 180 million pixels and currently, there is no standard format for an image of that size. Further, these pixels may be beyond the resolution of the human eye. More specifically, a 4K video pixel on a 40 foot screen may be approximately six mm wide. Thus, it may be appropriate to group pixels such that light efficiency may be increased and to make the guide structurally easier to build. Non square groupings and/or irregularly shaped groupings may be employed to match format dimensions of the larger screen or individual panels such as 16:9, and also to support using alternating groups to display left and right eye images for 3D picture and video viewing. Different color macro pixels may be used to implement at least a six color 3D viewing system in which the different stereo pairs may be displayed using 3 different primary colors and the viewer's eyewear can separate right from left eye images by employing different color filters for each eye. Accordingly, individual monitors may employ different color filters per set of macro pixels which is not now commercially done.

3D video/cinema viewing can be achieved by using fixed pattern retarders ("FPR") on alternating pixel groups or horizontal or vertical rows of macro pixels to display right and left eye images. FPR films may be used with 3D televisions and may typically include a polarizer, and then alternating lines of quarter wave plates to generate different handedness of circular polarization for the different lines. As such, the resolution may be approximately half of the format standard in the vertical or horizontal direction. With substantially all the pixels available in the video wall composite displays, full resolution, for example 4K cinema, can be maintained on groups of pixels. The FPR may be near the new image plane and attached to, adjacent to, or proximate to the diffuser. By employing a FPR scheme, standard passive eyewear may be used.

Figure 5:
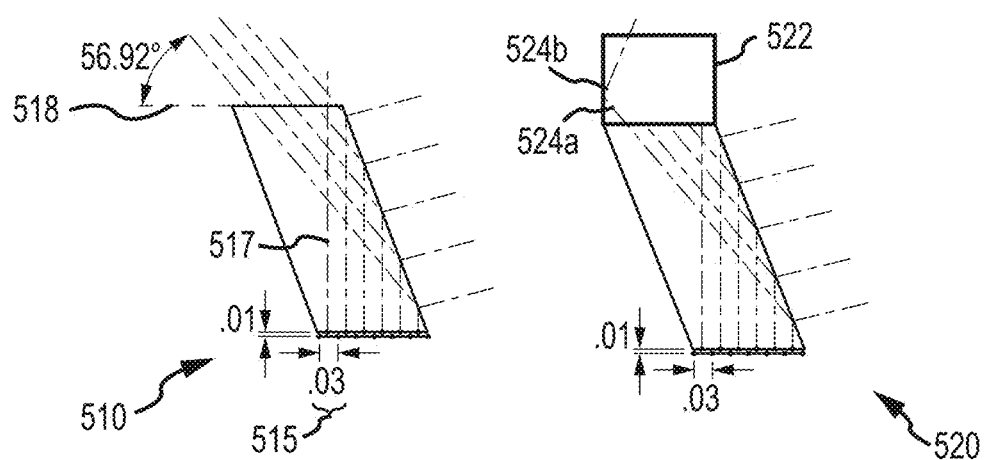
FIG. 5 is a schematic diagram illustrating embodiments of waveguides, in accordance with the present disclosure.

FIG. 5 is a schematic diagram illustrating embodiments of waveguides and more specifically two waveguide shapes. The angular distribution out of the waveguides may depend on the shape of the waveguide. The waveguide shapes can be smooth or with steps in the surface of the waveguide. FIG. 5 includes a waveguide 510 which illustrates a straight guide for a macro pixel 515 emitting a light ray 517. In the example without a waveguide, the angle distribution of the light from an original pixel may be substantially symmetrical around normal to the panel. However, in a system including a waveguide, the angle of the waveguide may distort the light pattern at the new image plane location 518. A diffuser can improve this new distribution. Waveguide 520 is another example of a waveguide that has a substantially straight section 522 at the upper end. As illustrated in FIG. 5, the substantially straight section 522 of the waveguide 520 may be long enough to allow for one or more reflections 524a and 524b of the higher angle rays then the angular distribution may match the distribution from the original macro pixel. The length of the straight part of the waveguide may depend on the x and y dimensions or in the plane of the panel, of the waveguide. In one example, the straight section of the waveguide may be as long as approximately twice the largest dimension in x or y. A diffuser can be used in conjunction with any of the previously discussed examples to improve the angular distribution of the light coming out of the new image plane.

One method of manufacturing of the aforementioned structures can be accomplished by 3D printing. With this method the metal and/or plastic may be deposited one layer at a time to generate the final part. Molds can also be generated for these macro waveguides. The parts may then be molded and coated with metal or molded in metal or reflective material. Injection molding may also be used to mold such waveguide parts into plastic from a machined mold.

Manufacturing may be simplified by allowing for inexact angles for each waveguide. The inexact angles may be any angle of the waveguide such as one side of the waveguide relative to another, the angle of the waveguide to the pixel surface, the angle of the upper straight section of the waveguide relative to the lower section of the waveguide, and so forth. In one example, the waveguides may vary according to position on the panel. The waveguides may vary in angle relative to the panel plane, may vary in exit pupil, some waveguides may have substantially straight sections at the top and other waveguides may not, any combination thereof, and so forth. The variance in waveguides is set forth to provide a few examples in which waveguides may vary from one another for explanatory purposes only and not of limitation, as there are many ways waveguides may vary from one another.

In another example, the individual bottom panel may be divided up into sections of common forms. The sections of common forms may include periodic arrangements of similar or the same type of waveguides, sections of macro pixels that may be similarly grouped, both, either one or the other, any other combination thereof, and so forth. The sections of common forms may then be assembled into the individual bottom panel. These sections of common forms may include discontinuities between sections and/or light exiting the waveguides, which may be allowable as long as the discontinuities are small enough so that the viewer cannot see them. Different materials can be used to form the waveguides including, but not limited to glass, plastic, or metals such as Silver, Aluminum, or Gold, or any combination thereof.

Figure 6:
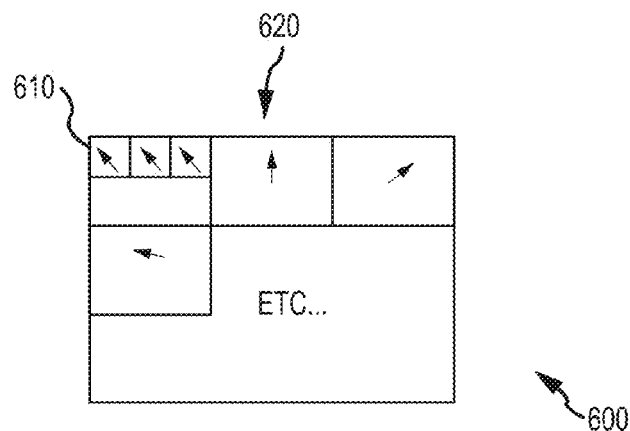
FIG. 6 is a schematic diagram illustrating one embodiment of a panel with sections and representative arrows illustrating the slant of waveguides for each section, in accordance with the present disclosure.
Figure 9:
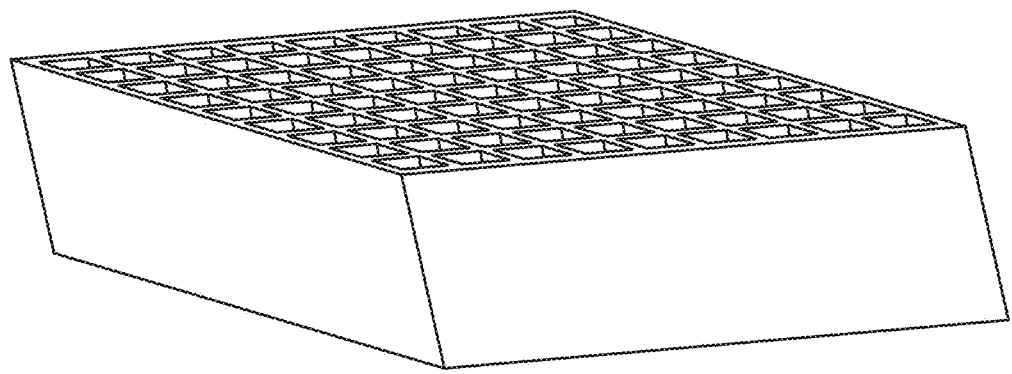
FIG. 9 is a schematic diagram illustrating an embodiment of a section of a waveguide, in accordance with the present disclosure.

Additionally, the waveguides may be manufactured or assembled onto substrates that have AR coatings and/or protective layers. The waveguides may also include diffusers to more uniformly present light to the viewers located in different viewing positions. FIG. 6 is a schematic diagram illustrating one embodiment of a panel with sections and representative arrows illustrating the slant of waveguides for each section. Further, FIG. 6 illustrates one example of a panel 600 that is divided up into sections and includes arrows which represent the approximate slant of the waveguides in that section from a top down view. As illustrated, waveguides located in section 610 may be angled approximately towards the top and left of the panel 600, while the waveguides located in section 620 may be angled approximately towards the top of the panel 600. Furthermore, the waveguides within the sections may gradually change in slant as opposed to an approximately consistent slant within each section as illustrated in FIG. 6. For example, the waveguides located in section 610 may have gradually varying slants across the section 610. Additionally, although FIG. 6 illustrates the panel sections as rectangular and uniform, the sections may be any shape and may or may not be uniform in size. Additionally, FIG. 9 provides an embodiment of a two dimensional section of a waveguide. Generally, waveguides can also contain fiducial marks such as crosshairs, rectangles, and so forth, as used in lithography to facilitate the alignment of the subsections into a full panel and/or for aligning a full panel sized structure to the display panel Propagation Based Elimination Another method to visually eliminate the gaps between the active displays may be to assemble groups of pixels that are roughly the size of the total gap width. In one example, the gaps between panels may be approximately the same and the grouped pixels may be approximately the same size in x and y as the total gap width. In another example, the gap width may vary in x and y and also may vary in x between sets of panels. In this example, the grouped pixels may be approximately the size of the largest gap. Moreover, the grouped pixels may vary in size across the panel according to the gap size. In another example, the gap width may be increased between panels by turning pixels off adjacent to the gap.

Figure 7:
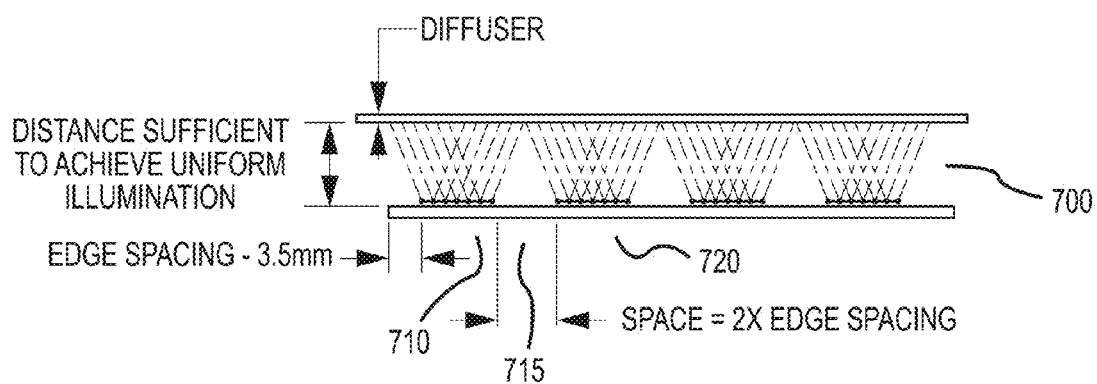
FIG. 7 is a schematic diagram illustrating one embodiment of an active display with assembled groups of pixels, in accordance with the present disclosure.

FIG. 7 is a schematic diagram illustrating one embodiment of an active display with assembled groups of pixels. As illustrated in FIG. 7, the active display 700 includes assembled groups of pixels or macro pixels 710, 715, 720, and so forth. Furthermore, each display may include one or more macro pixels in which the macro pixels may be similarly sizes, similarly shapes, various sizes, various shapes, any combination thereof, and so forth. Every other group of the macro pixels may be illuminated or used to display information to keep the illumination substantially uniform across the larger display area.

For example and as illustrated in FIG. 7, macro pixels 710 and 720 may be illuminated or used to display information, while macro pixel 715 may not be illuminated or may not display information. If this were done with no other correction or measure, it may result in a "screen door" effect in which every macro pixel group may be resolvable and each pixel may be isolated by a noticeable dark band, similar to viewing images through a screen door. To substantially eliminate this effect, the light from the macro pixels may be allowed to expand by propagation such that the dark band may be substantially imperceptible at a new image plane or until the light nearly encounters the light from the neighboring illuminated macro pixels. Additionally, the new image plane may be located approximately at or around the plane at which the light from neighboring illuminated macro pixels interacts such that the gaps between the panels is substantially imperceptible or around a just noticeable difference. Further, the light from the neighboring illuminated macro pixels may nearly meet or may actually meet, or there may be gaps between the light from the neighboring illuminated macro pixels to create the new image plane.

Continuing this discussion, a diffuser may be located near the approximate plane or location where the light from neighboring illuminated macro pixels nearly meet, as the new screen location or new substrate location for a continuous display surface. As previously discussed, this plane located where the light from neighboring illuminated macro pixels interact to make the gaps between the panels substantially imperceptible may be referred to as the new image plane. Further, the new substrate location may be located approximately near new image plane (the plane at which the light from neighboring illuminated macro pixels interacts such that the gaps between the panels are substantially imperceptible). If the light from the macro pixels does not expand fast enough or expands too slowly so that the gaps between the panels are still perceptible, micro lenses which may be either positive or negative, can be placed on the display, substantially matched to the macro pixels to tailor the expansion and angle distribution of the display. Roughly the distance from the pixel plane to where the diffuser may be located is related to the half angle of the pixel divergence ($\tau$) measured from surface normal and the gap distance between macro pixels (d) such that the diffuser is placed near to the distance ($d/2 \tan \tau$). Macro pixel size may be roughly close to the seam distance in that direction or slightly larger. A disadvantage to this method may be a loss in light throughput, however, these displays are so bright that even with this loss, 14 ftL can still be achieved in 3D.

Again a FPR across the macro pixels can be used to allow for two images, right and left, to be displayed and separated by passive eyewear to achieve the 3D effect. The diffuser which may be employed as the screen may be AR coated and have a protective coating for protection against damage and to allow for easy cleaning. The diffuser can be the top surface of a plane of plastic or glass that may be assembled onto the display panel. The top surface and the display may be assembled in various ways, including but not limited to, gluing, fastening, mechanically held together, any combination thereof, and so forth. In one example, the diffuser and the FPR may be proximate or adjacent to each other or fabricated together. The light may propagate into the plane of glass or plastic before encountering the diffuser. The diffuser can be molded onto the surface of the display, deposited, etched, and so forth. As mentioned above, a 6 color 3D system can also be implemented by using different color primaries for the particular macro pixels for the different stereo pairs displayed. These displays may display the corresponding stereo pairs at substantially the same time using different sets of macro pixels with different color primaries or they may be time sequentially displayed.

Panel Brightness and Color Correction

Matching the brightness and color of the individual displays across the larger surface may be appropriate for a display. The displays can be illuminated by LEDs which last a long time but may age differently. The color between displays can be calibrated on installation using a color meter in front of each display and the display color may be tuned to the same values for each panel in the array. This can be periodically repeated to substantially maintain a similar color in each of the displays.

Figure 8:
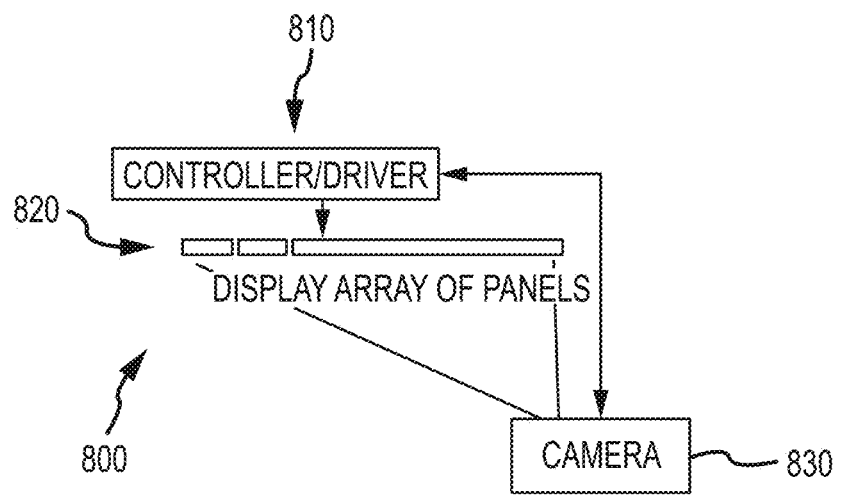
FIG. 8 is a schematic diagram illustrating one embodiment of a calibration system, in accordance with the present disclosure.

Brightness non uniformity may also be a noticeable effect which may be addressed by employing a digital camera which may be located in the viewing space. The camera may be employed to take a picture of the entire display area. The brightness of the individual displays may then be adjusted by computer control to make the brightness substantially uniform across the large display area or array as illustrated in FIG. 8. FIG. 8 is a schematic diagram illustrating one embodiment of a calibration system. As illustrated in FIG. 8, the calibration system 800 includes a controller 810, display 820, and a camera 830. The driver or controller 810 may be operably connected to the display 820 and the camera 830. Further, in operation and as previously discussed, the camera 830 may be used to take a picture of the display 820. The picture may include, among other information, brightness uniformity and color uniformity from panel to panel of the display 820. Continuing this example, the controller 810 may employ the information from the camera 830 to adjust the brightness and/or color point of the individual panels of the display 820.

In one embodiment of FIG. 8, the calibration may be performed with all white screens. Individual portions of each panel of the display, including on the macro pixel level, can be adjusted to get a substantially uniform brightness. In one system, the camera may be attached to a wall or otherwise protected from being bumped and thus misaligned. Such a system may be employed with either method discussed above.

The displays discussed herein may be bright enough to present cinema quality video in non-darkened rooms or public areas. Further, these systems may be used in public spaces including, but not limited to, stadiums, class rooms, airports, control rooms, and so forth. The systems may be employed in smaller venues as well due to the high pixel density and large size of the display system.

The tiled display systems may be controlled by a system with multi-monitor video cards, or a system that may include specialized video cards and/or processors which may be designed specifically for the tiled display systems. Additionally, in one embodiment, the tiled display system may employ processors, computer systems, computers, central processing units, servers, audiovisual systems, displays, and so forth that may communicate via networking equipment.

Architecture with DCI Security

Generally, initial content and equipment standards for digital cinema have been set forth regarding storing, playing and handling movies and related content in theaters and other exhibition and/or display venues. General standards are set forth in the DCI specification and more specifically the specification document version 1.2, which is herein incorporated by reference in its entirety.

Figure 10:
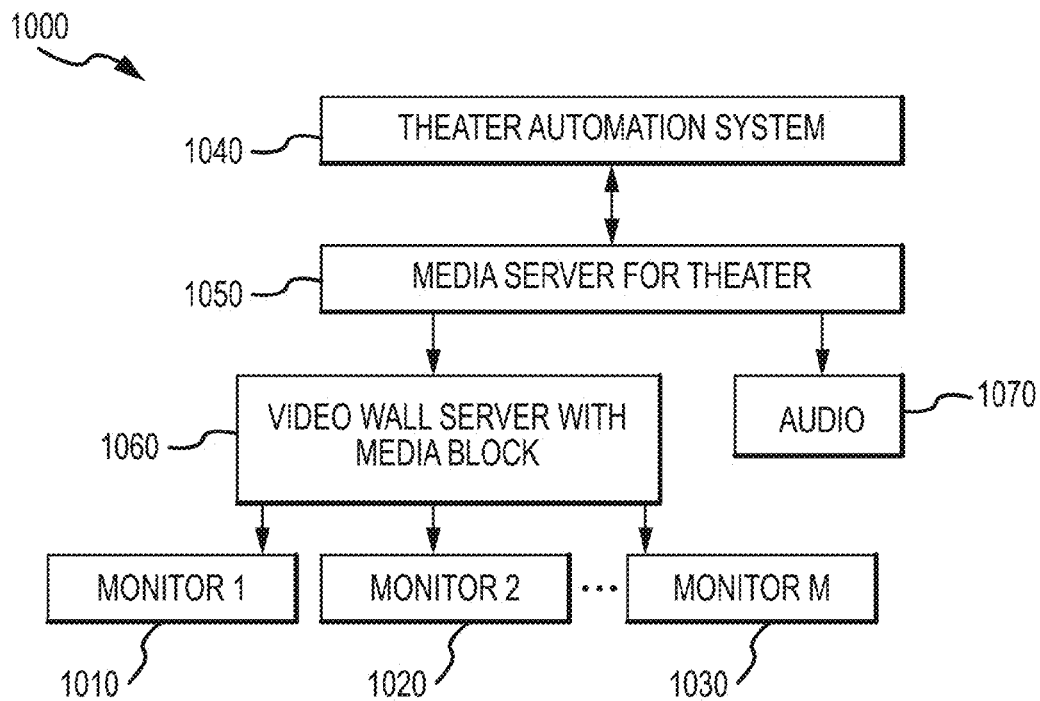
FIG. 10 is a schematic diagram illustrating one embodiment of a display system architecture, in accordance with the present disclosure.

FIG. 10 is a schematic diagram illustrating one embodiment of a display system architecture 1000. As illustrated in FIG. 10, the display system architecture 1000 includes multiple monitors, 1010, 1020, 1030 and so on. Although three monitors are used in the example of FIG. 10 for the purposes of discussion, more monitors or fewer monitors may be employed in the display system architecture. The display system architecture 1000 also includes a theater automation system 1040, a media server 1050, a video wall server 1060 and audio system 1070. The configuration of the display system architecture of FIG. 10 provides only an example and is discussed for explanatory purposes and not of limitation as the servers, controllers, and systems may be configured in various ways other than the specific configuration of FIG. 10.

The theater automation system 1040 may perform functions such as turning on/off the theater lights, opening or closing the curtains, and/or controlling other equipment that may be employed to display the appropriate content. Currently, DCI compliant servers and theater automation equipment are used in theaters and a seamless video wall that may include multiple monitors may be compatible with this equipment and may conform to similar or the same standards as illustrated in FIG. 10.

In FIG. 10, the theater automation system 1040 may be operable to communicate with at least the media server 1050. In one example, the media server 1050 may store movie content which may be stored as DCI packages. The media server 1050 may also perform various functions including, but not limited to, intaking or loading, storing, and playing movies or other media content. Furthermore, the DCI packages may be encrypted and then may be loaded onto the media server 1050. The DCI packages may include the movie content as well as other general content such as play lists and trailers. The movie content can be played if the media server has been provided with the correct security keys.

In FIG. 10, the media server 1050 and theater automation system 1040 may function as if communicating with a projection system. In one example, the functions may include the media server 1050 sending the appropriate audio files to the audio system 1070 and sending the appropriate encrypted video files to the video wall server 1060. The interfaces may be similar to or the same as for digital projectors, for example 100 Base-T Ethernet. The controller or video wall server 1060 may include the media block that handles the security information and decrypt the files. In one example, the media block may be an internal media block (IMB). The files may then be formatted, the intensity envelope may be processed, and then the appropriate sub-pictures may be sent to the individual monitors 1010, 1020, 1030, each of which will be discussed in further detail herein. The IMB may be integrated into the video wall server which may be in a secure locked enclosure so that the unencrypted movie content may not be physically accessible as is set forth in the DCI specification. Commercial IMB can be used for this if the server mimics the functionality of a DCI projector.

In one example, the security conditions may include enclosing the back of the video wall such that the enclosure may have interlocks to substantially prevent access to the signals going to the monitors. This enclosure may be a cage or a box with holes that may allow for air flow and system cooling and that additionally substantially prevent access to the cables. The signals for the sub-pictures may be encrypted and may be sent to the monitors by 100 Base-T Ethernet or another approved interface. The interface electronics of the monitor may then decrypt the sub-picture signals and may play them. The interface electronics may also be encased on the back of the monitor along with the decryption and cabling such that access may be prevented to the interface electronics as well.

In addition to managing the data, the video wall server 360 or controller may also manage interlocks issues, reporting of errors such as by Ethernet, RS422 or other standard interfaces, powering down the monitors when not in use to minimize energy usage and prolong the lifetime of the displays, any combination thereof, and so forth.

Formatting

Figure 11:
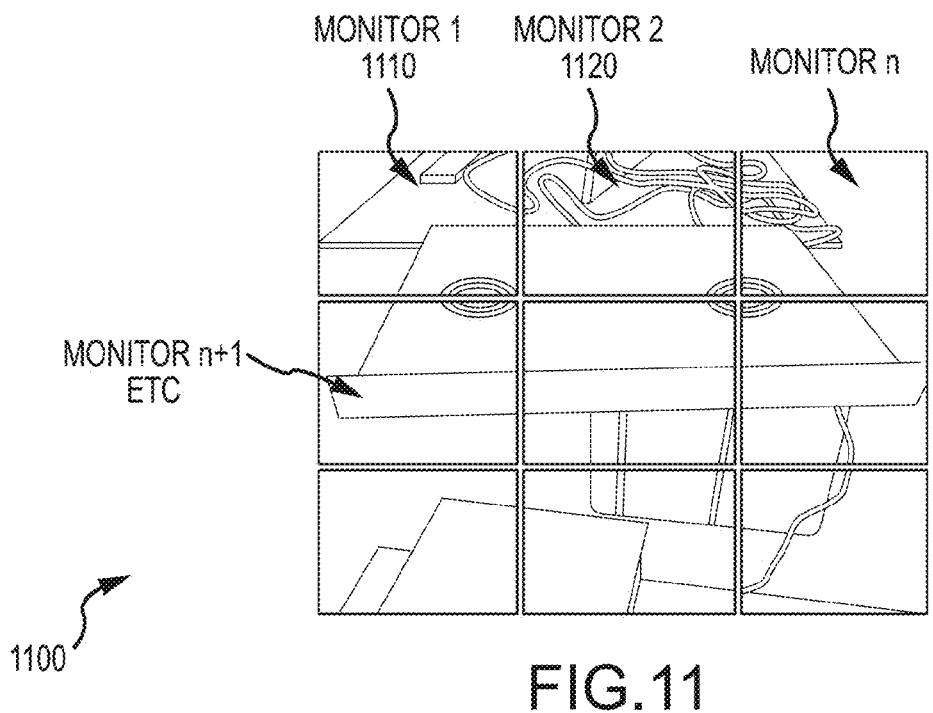
FIG. 11 is a schematic diagram illustrating one embodiment of a display system with an incoming signal that may be split into sub-pictures, in accordance with the present disclosure.

The first step in formatting may be to split the incoming content, which may be video content, into the various tiles that may be displayed on the individual monitors that make up the overall display. FIG. 11 is a schematic diagram illustrating one embodiment of a display system 1100 with an incoming signal that may be split into sub-pictures. As illustrated in FIG. 11, the incoming signal may be formatted by splitting the incoming signal into sub-pictures for display on the monitors that make up the overall display. The sub-picture may be determined by its spatial location in the overall image display. Stated differently, in FIG. 11, Monitor 1 1110 may display a sub-picture formatted for and may include display information for the upper left corner area of the display system 1100, while Monitor 2 1120 may display a sub-picture formatted for and which may include display information for the upper center area of the display system 1100, and so forth. These sub-pictures may be scaled to fill the corresponding individual monitor appropriately.

In one example, a 40 foot display may have approximately ninety, 55 inch monitors configured in a 10×9 grid. The content may be formatted as 2K or 2048×1080 pixels or 4K or 4096×2160 pixels formats, however high resolution formats may be achieved as well. Each monitor may be assigned a spatial portion of the video stream. Continuing this example, a single 55 inch 1920×1080 HD monitor may receive a 409× 240 sub-picture to display and/or represent. Although HD monitors may be employed, lower resolution or higher resolution may also be used. The cost of the monitor may also be a factor in determining the resolution. This sub-picture may be scaled to fill the monitor's pixels appropriately. Fractional pixels can be rounded down or up but each monitor may receive a patch or sub-picture of the whole picture to display and which may depend on its spatial location in the entire display wall.

After dividing the video stream into sub-pictures for each monitor, the data may be formatted on the display. As previously discussed, macro pixels of more than one monitor pixel may be formed to represent each data/picture pixel and the macro pixels can be various shapes or forms including, but not limited to, square, rectangles, solid circles, and so forth. The size of the macro pixels may be determined by the video format, in one example 4K, and also may be determined by overall display size, such as 20×40 feet. For typical theaters this may result in macro pixels in the approximate range of 1-12 mm. To account for the appropriate spacing between macro pixels, the macro pixels may be made smaller than the predetermined value such that upon expanding, the light from adjacent macro pixels may expand and fill in correctly or provide the appearance of substantially uniform light approximately at the diffuser plane. There can still be space between the light emitted from the macro pixels at the diffuser plane which may be located at approximately the new image plane. Macro pixel size may be related to the size of the seam between panels in that particular direction so that the seam can be concealed. Further the macro pixel size may be based at least in part on the size of the seam between panels. In one example and in accordance with the previous discussion, the method of propagation to a diffuser may be employed to make substantially seamless video walls. In this example, the macro pixels may be spaced apart by approximately the separation between monitors in the grid. In another example, the monitors may have approximately 3 mm separation between the nearest pixels on adjacent monitors, thus the spacing between macro pixels on each monitor may be approximately 3 mm.

Additionally, the macro pixels may have increased spacing by the limit of the viewer's resolution, which may be in the approximate range of 1-2 mm additional, or a little bit larger than the gap.

Figure 12:
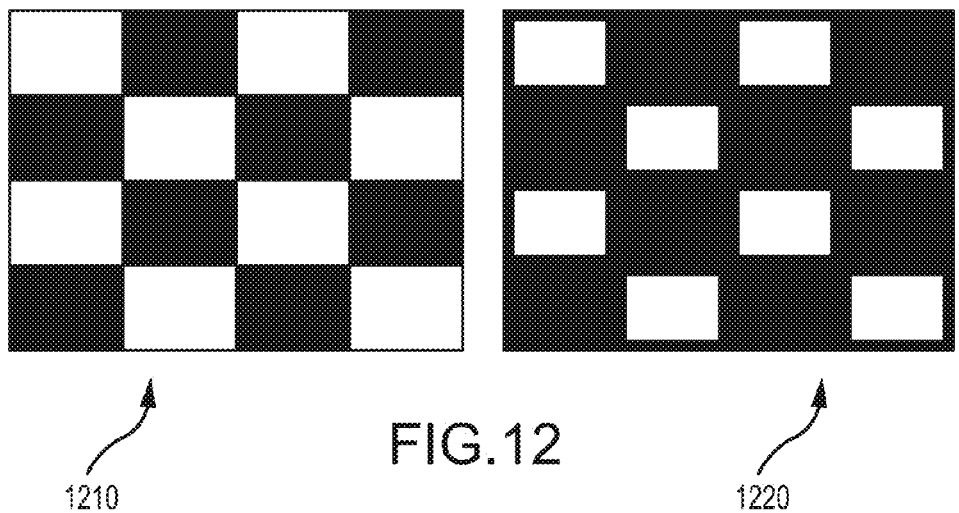
FIG. 12 is a schematic diagram illustrating one embodiment of a data pattern and another embodiment of a formatted display, in accordance with the present disclosure.

FIG. 12 is a schematic diagram illustrating one embodiment of a data pattern and another embodiment of a formatted display. FIG. 12 also shows a checkerboard pattern that may be intended for display and also shows a formatted checkerboard pattern that may be spaced out in 2 dimensions for the gap between monitors. Additionally as illustrated in FIG. 12, image 1210 illustrates one example of a data pattern with macro pixels and image 1220 illustrates one example of a formatted display for propagation method with smaller macro pixels with the size of the macro pixels roughly corresponding to the monitor to monitor gap. This spacing may allow the light from the macro pixels to propagate and spread until the light approximately contacts the diffuser without too much overlap or too much black space between macro pixels on the diffuser or display surface for the viewer. It may be evident when too much overlap or too much black space between the light from adjacent macro pixels occurs, as the seams between displays and/or the gap between the pixels may be visible. The patterns can be centered on the monitor if fractional pixels are missing, and so forth.

In another example and also previously discussed, the waveguide method may be employed to make a substantially seamless video wall, and the macro pixels may be approximately the size of the opening to a waveguide or a little smaller. The approximate location of the walls of the waveguide may correspond to black pixels on the display so that the macro-pixels may also be spaced out by approximately the waveguide wall thickness. This space may be substantially occupied by black pixels or pixels that are not emitting enough light to be visible. This may substantially reduce and/or prevent light scattering from the walls of the waveguides by light that may not directly enter the waveguide.

Generally, for 3D displays, a fixed pattern retarder (FPR) can be used on the monitors to generate the appropriate polarization changes to present two different views, or one view for each eye and the viewers may wear the passive polarization glasses used in theaters. Currently, displays may generate the two views by alternating the polarization per vertical line of the display. This method may also be employed for the video walls with the appropriate macro pixel(s) for each eye using the appropriate vertical lines. Resolution and brightness may be sufficient so that 2K, 4K, or 8K can be substantially achieved on the entire display with sufficient brightness. The brightness of an LCD may be approximately 100-200 ftL while the cinema standard may be approximately 14 ftL.

Generally, it may be difficult to achieve 14 ftL with projectors in a 3D system due to the extra losses of the system, but a video wall may support 14 ftL in 3D mode. It may also be possible in one example, to make FPRs that cover the appropriate macro pixel structure and that may use alternating macro pixel lines for the two polarizations. Continuing this example, the macro pixel structure may be determined by the size of the seams between displays and may be adjusted in the formatting software, thus different line sizes of FPR may be employed. It may be desirable to leverage the high volume product with standard alternating FPR per monitor lines.

The panels can also run or be driven relatively fast, and in one example greater than 240 Hz, which can be used to support fast frame rate motion pictures. The diffuser can be part of a thick plastic sheet of the appropriate thickness to place the diffuser at a new image plane. The diffuser can be a surface or volume diffuser and in one example, the diffuser screen that may be employed may be similar to a diffuser screen made for a rear projection television. As previously discussed, the new image plane may be located in front of the screen by a distance that may allow the light from the macro pixels to expand and substantially fill most or all of the gaps between the macro pixels. In one embodiment, each panel can have this diffuser or both the diffuser and FPR applied before the video wall is assembled so that the seam in between diffusers may be located in the gap between the panels or monitors. The gap between the monitors may be black and the frame on the monitor may be black or matte black to substantially reduce or prevent unwanted light reflections. The diffuser distance from the monitor may be related to the monitor pixel size and the gap between monitors and/or macro pixels. In another embodiment the diffuser or both the diffuser and FPR can be larger than single panel and can be as large as the whole video wall. This larger version of the diffuser or both the diffuser and FPR can also be seamed from smaller portions to cover the whole wall. Furthermore, at the new image plane, the outside surface of any of the substrate, the diffuser or the FPR may be a matte finish.

Envelope Function

Typical movie screens that receive light with projectors may have an intensity falloff from the center of the screen to the edges. For movies or projection technology, the edge intensity of the screen may be approximately 70-80% of the center intensity of the screen which complies with the DCI specification for theaters. For viewing rooms or small theaters that may be used to review movies for editing or an award screening, the desired falloff may be approximately 90%. In addition, theaters may include alternative content for the public such as sports and/or musical events. The alternative content may employ a different intensity profile than may be employed for movie content. This intensity fall off or intensity envelope function from center to edges may be a result of the natural intensity fall off due to the projector. Tiling screens together may result in a screen that may be substantially uniform in intensity across the entirety of the tiled screen surface.

In some cases, intensity uniformity across the tiled screen surface may not be desirable. For example, directors may use the intensity fall off to focus the attention of the viewer to the center of the screen. By employing monitors to make up the screen it may be possible to specify a different intensity envelope function for a particular movie or even for individual scenes in the movie or event. In addition, intensity functions that are impossible to achieve with projectors may be achieved by the digital tiled screens. For example, flat intensity profiles or profiles with brighter edges than the center can be specified. The intensity envelope function can be achieved by limiting the brightness of the individual screens as a function of the physical location in the larger display. The monitors may be brighter than any intensity that may be employed, thus limiting the brightness may be possible without significantly affecting the desired overall brightness of the movie and/or content. This limiting or scaling of intensity values may depend on position and may be employed nearly continuously across the monitors themselves as well as across multiple monitors. The digital values that represent the content to be presented can be scaled by a digital processor to generate the desired envelope function.

Figure 13:
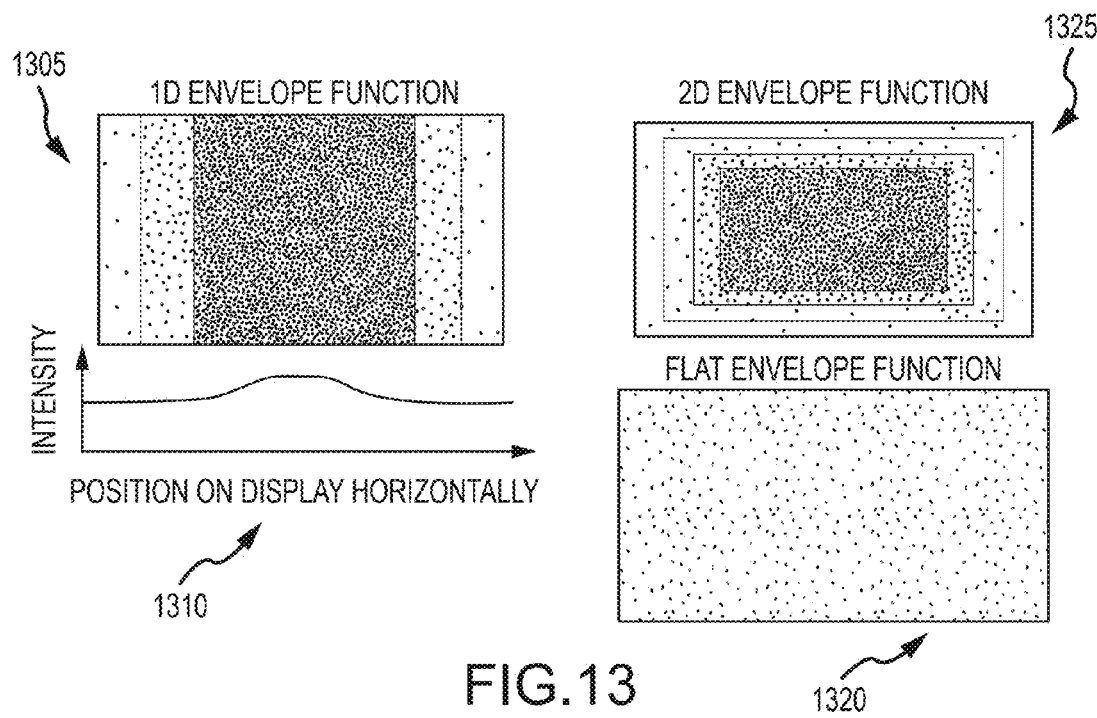
FIG. 13 is a schematic diagram illustrating examples of envelope functions, in accordance with the present disclosure.

FIG. 13 is a schematic diagram illustrating examples of envelope functions. The envelope function can be one dimensional as shown in function 1310 or substantially along the horizontal direction and uniform vertically. As illustrated in FIG. 13, intensity graph 1305 varies in intensity in the horizontal direction and is substantially uniform in the vertical direction. The envelope function may be mostly uniform across the display as in 1320. Also illustrated in FIG. 13, intensity graph 1325 varies in intensity in both the horizontal and vertical directions. These functions may be employed and specified for both 2D and 3D content.

It should be noted that embodiments of the present disclosure may be used in a variety of optical systems, display systems and projection systems. The embodiment may include or work with a variety of projectors, projection systems, display systems, optical components, computer systems, processors, entertainment systems, self-contained projector systems, visual and/or audiovisual systems and electrical and/or optical devices. Aspects of the present disclosure may be used with practically any apparatus related to display, optical and electrical devices, optical systems, display systems, presentation systems or any apparatus that may contain any type of optical system. Accordingly, embodiments of the present disclosure may be employed in optical systems, devices used in visual and/or optical presentations, visual peripherals and so on and in a number of computing environments including the Internet, intranets, local area networks, wide area networks and so on.

Before proceeding to the disclosed embodiments in detail, it should be understood that the invention is not limited in its application or creation to the details of the particular arrangements shown, because the invention is capable of other embodiments. Moreover, aspects of the embodiment may be set forth in different combinations and arrangements to define embodiments unique in their own right. Also, the terminology used herein is for the purpose of description and not of limitation.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A method for reducing the appearance of seams in a video wall, the method comprising:
    locating a first panel proximate to a second panel, wherein a seam is formed by the first and second panels, wherein the first panel comprises first and second macro pixels, the first and second macro pixels each comprising a plurality of pixels, and wherein the second panel comprises a third macro pixel;
    locating a first waveguide so that light from the first macro pixel is substantially coupled into the first waveguide;
    locating a second waveguide so that light from the second macro pixel is substantially coupled into the second waveguide, wherein the first and second waveguides are angled towards different portions of the first panel and are operable to relay light from the first and second macro pixels of the first panel, respectively, to an image plane, and wherein relaying the light from the first macro pixel to the image plane and relaying the light from the second macro pixel to the image plane result in different magnifications; and
    locating a third waveguide so that light from the third macro pixel included in the second panel is substantially coupled into the third waveguide, wherein the third waveguide is operable to relay light from the third macro pixel to the image plane with a magnification.

2. The method for reducing the appearance of seams in a video wall of claim 1, further comprising substantially overlapping a first perimeter of the first panel with a second perimeter of the second panel.

3. The method for reducing the appearance of seams in a video wall of claim 1, further comprising locating a substrate at the image plane.

4. The method for reducing the appearance of seams in a video wall of claim 3, wherein the substrate is a diffuser.

5. The method for reducing the appearance of seams in a video wall of claim 1, wherein locating the first waveguide further comprises locating the first waveguide of axis relative to the plane of the first panel.

6. The method for reducing the appearance of seams in a video wall of claim 1, wherein at least the first waveguide has a first section and a second section, wherein the first section is operable to receive light from the first macro pixel and is angled off axis relative to the plane of the first panel, and the second section of the first waveguide has a substantially straight section from which the light exits.

7. The method for reducing the appearance of seams in a video wall of claim 1, further comprising determining the length of the second section of the first waveguide by accounting for at least the x and y base dimensions of the first section of the first waveguide.

8. The method for reducing the appearance of seams in a video wall of claim 1, further comprising varying the off axis angle of the first waveguide and the off axis angle of the second waveguide such that the off axis angle of the first waveguide and the off axis angle of the second waveguide are different.

9. The method for reducing the appearance of seams in a video wall of claim 3, further comprising locating a fixed pattern retarder proximate to the substrate at the new image plane.

10. The method for reducing the appearance of seams in a video wall of claim 3, further comprising allowing the first macro pixel and the second macro pixel to employ six colors to create stereoscopic images.

11. The method for reducing the appearance of seams in a video wall of claim 10, further comprising allowing the first macro pixels and the second macro pixels to display corresponding stereo pairs at substantially the same time with a first set of colors corresponding to the first macro pixel and a second set of colors corresponding to the second macro pixel.

12. The method for reducing the appearance of seams in a video wall of claim 10, further comprising allowing stereoscopic images to be produced by displaying time sequential images.

13. A video wall comprising:
- a first panel comprising first and second macro pixels, the first and second macro pixels each comprising a plurality of pixels;
- a second panel comprising a third macro pixel, the third macro pixel comprising a plurality of pixels, wherein a seam is formed by the first panel and the second panel;
- a first waveguide aligned with the first panel so that light from the first macro pixel is substantially coupled into the first waveguide;
- a second waveguide aligned with the first panel so that light from the second macro pixel is substantially couple into the second waveguide, wherein the first and second waveguides are angled towards different portions of the first panel and are operable to relay light from the first and second macro pixels of the first panel, respectively, to an image plane, and wherein relaying the light from the first macro pixel to the image plane and relaying the light from the second macro pixel to the image plane result in different magnifications;
- a third waveguide aligned with the second panel so that light from the third macro pixel is substantially coupled into the third waveguide, wherein the third waveguides is operable to relay light from the third macro pixel to the image plane with a magnification.

* * * * *